(12) United States Patent
Alderson et al.

(10) Patent No.: US 9,082,569 B2
(45) Date of Patent: Jul. 14, 2015

(54) ELECTRICAL DEVICES WITH REMOVABLE ACTUATOR FRAMES

(75) Inventors: R. David Alderson, Morganton, NC (US); Michael D. Williams, Morganton, NC (US)

(73) Assignee: Leviton Manufacturing Co., Inc., Melville, NY (US)

( * ) Notice: Subject to any disclaimer, the term of this patent is extended or adjusted under 35 U.S.C. 154(b) by 407 days.

(21) Appl. No.: 12/768,600

(22) Filed: Apr. 27, 2010

(65) Prior Publication Data
US 2011/0259722 A1 Oct. 27, 2011

(51) Int. Cl.
| H01H 23/02 | (2006.01) |
| H05K 5/03 | (2006.01) |
| H01H 23/04 | (2006.01) |
| H02G 3/14 | (2006.01) |
| H01H 23/14 | (2006.01) |

(52) U.S. Cl.
CPC .............. *H01H 23/04* (2013.01); *H02G 3/14* (2013.01); *H01H 23/145* (2013.01)

(58) Field of Classification Search
USPC ........ 200/312–315, 553, 339; 174/53, 66, 67, 174/57; 220/4.02, 3.94, 3.92, 3.9, 3.8, 3.7
See application file for complete search history.

(56) References Cited

U.S. PATENT DOCUMENTS

| 2,439,708 | A |   | 4/1948  | Abraham |          |
|-----------|---|---|---------|---------|----------|
| 3,598,950 | A | * | 8/1971  | Ohashi  | 200/315  |
| 3,885,116 | A | * | 5/1975  | Kodaira | 200/308  |
| 4,029,915 | A | * | 6/1977  | Ojima   | 708/145  |
| 4,218,602 | A |   | 8/1980  | Creech  |          |
| 4,242,552 | A | * | 12/1980 | Tibolla | 200/339  |
| 4,710,602 | A | * | 12/1987 | Baity et al. | 200/315 |
| 4,808,778 | A | * | 2/1989  | Fujiyoshi | 200/339 |
| 4,943,694 | A | * | 7/1990  | Kroth   | 200/332.1 |
| 4,947,008 | A | * | 8/1990  | Sato et al. | 200/6 R |
| 5,036,168 | A |   | 7/1991  | Kikuchi et al. |     |
| 5,213,204 | A | * | 5/1993  | Sommer  | 200/303  |
| 5,317,108 | A |   | 5/1994  | Prairie, Jr. |      |
| 5,336,861 | A | * | 8/1994  | Cummins et al. | 200/339 |

(Continued)

FOREIGN PATENT DOCUMENTS

| KR | 20-1992-0003364 Y1 | 5/1992 |
| KR | 10-2003-0039979    | 5/2003 |

(Continued)

OTHER PUBLICATIONS

International Search Report for PCT/US2011/033663, dated Jan. 2, 2012, 9 pages.

*Primary Examiner* — Briggitte R Hammond
(74) *Attorney, Agent, or Firm* — Marger Johnson & McCollom

(57) ABSTRACT

In one embodiment, a system may include an electrical device, an actuator for the electrical device, and an interchangeable frame configured to be removeably attached to the electrical device and to hold the actuator. The frame may be adapted to pivotally engage the electrical device. In another embodiment, an electrical device may have an interface adapted to enable a frame to be attached to and removed from the electrical device, an opening in the electrical device, a subactuator arranged to actuate a switch in the electrical device through the opening, and to engage an actuator on the frame when the frame is attached to the electrical device, and a first rim disposed about the opening. The subactuator may include a second rim arranged to overlap the first rim.

23 Claims, 12 Drawing Sheets

(56) References Cited

U.S. PATENT DOCUMENTS

| | | | |
|---|---|---|---|
| D360,876 S | 8/1995 | Hughes | |
| 5,594,208 A * | 1/1997 | Cancellieri et al. | 174/58 |
| 5,783,787 A | 7/1998 | Data | |
| 5,895,888 A | 4/1999 | Arenas et al. | |
| 5,934,451 A * | 8/1999 | Yu et al. | 200/315 |
| D416,871 S | 11/1999 | Todd | |
| 6,005,308 A * | 12/1999 | Bryde et al. | 200/335 |
| 6,160,219 A | 12/2000 | Maltby et al. | |
| D440,946 S | 4/2001 | Yu | |
| 6,384,354 B1 * | 5/2002 | Shotey et al. | 200/333 |
| D473,528 S | 4/2003 | Wengrower | |
| 6,794,592 B1 * | 9/2004 | Liu et al. | 200/302.3 |
| 6,891,117 B1 | 5/2005 | Gouhl et al. | |
| 6,914,206 B2 * | 7/2005 | Mukougawa | 200/556 |
| 6,956,169 B1 * | 10/2005 | Shotey et al. | 174/58 |
| 7,049,537 B1 * | 5/2006 | Shotey et al. | 200/333 |
| D523,824 S | 6/2006 | Lombardi et al. | |
| D534,875 S | 1/2007 | Wu | |
| 7,179,996 B1 * | 2/2007 | Britt et al. | 174/66 |
| 7,273,983 B1 * | 9/2007 | Rintz | 174/66 |
| 7,396,997 B2 | 7/2008 | Dinh | |
| 7,415,310 B2 | 8/2008 | Bovee et al. | |
| D576,566 S | 9/2008 | Wu et al. | |
| D576,961 S | 9/2008 | Kidman | |
| 7,425,681 B2 | 9/2008 | Xu et al. | |
| 7,431,594 B2 | 10/2008 | Castaldo | |
| 7,435,903 B2 * | 10/2008 | Tufano et al. | 174/66 |
| D583,335 S | 12/2008 | Ni | |
| 7,476,121 B2 * | 1/2009 | Tsuji | 439/471 |
| 7,538,285 B2 * | 5/2009 | Patel et al. | 200/315 |
| D595,664 S | 7/2009 | Simard et al. | |
| 7,579,566 B2 | 8/2009 | Sloan et al. | |
| D606,028 S | 12/2009 | Chou | |
| D606,029 S | 12/2009 | Chou | |
| D609,650 S | 2/2010 | Chou et al. | |
| 7,756,556 B2 | 7/2010 | Patel et al. | |
| 7,777,145 B2 | 8/2010 | Burrell et al. | |
| 7,915,528 B2 | 3/2011 | Ni | |
| 7,968,794 B1 | 6/2011 | Baldwin | |
| D651,182 S | 12/2011 | Alderson et al. | |
| 8,138,435 B2 * | 3/2012 | Patel et al. | 200/315 |
| 2003/0226682 A1 | 12/2003 | Tufano et al. | |
| 2007/0193863 A1 | 8/2007 | Wu | |

FOREIGN PATENT DOCUMENTS

| | | |
|---|---|---|
| KR | 20-0405520 Y1 | 1/2006 |
| KR | 10-0632451 | 9/2006 |
| KR | 20-2009-006210 U | 12/2007 |

* cited by examiner

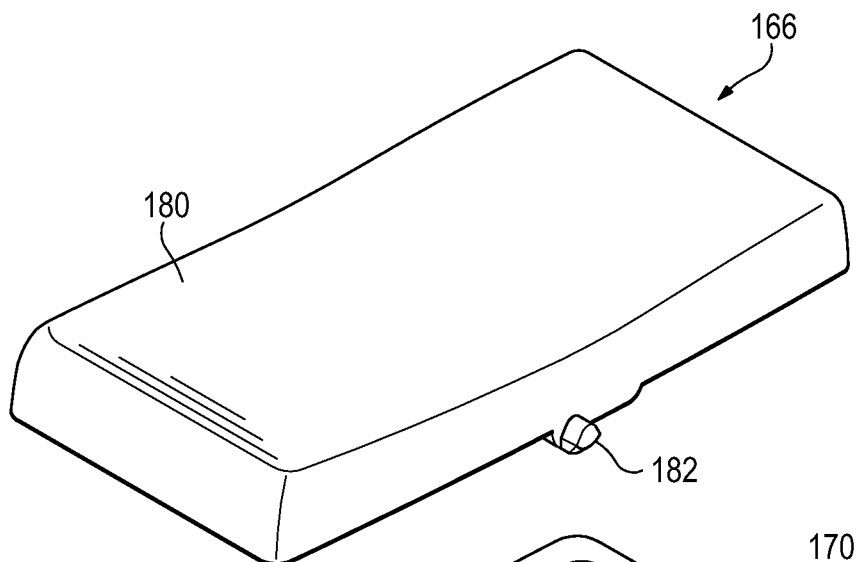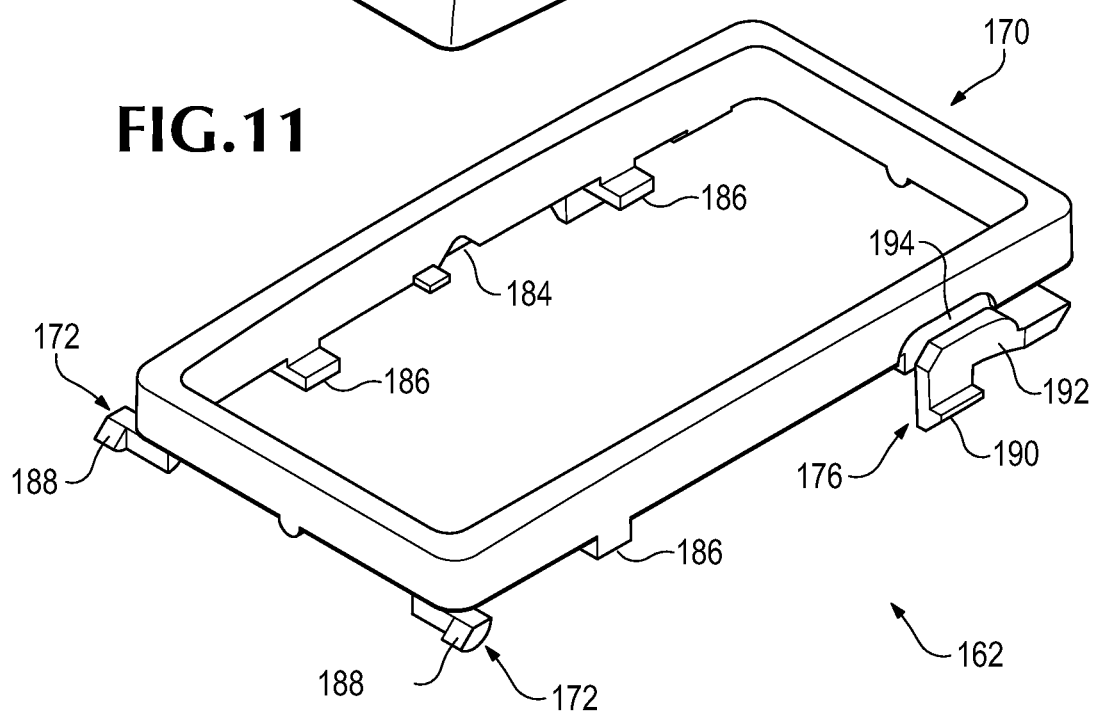
FIG.11

ELECTRICAL DEVICES WITH REMOVABLE
ACTUATOR FRAMES

BACKGROUND

FIG. 1 is a simplified side view of a prior art dimmer switch 10. The dimmer switch includes a housing 12 for enclosing the dimming circuitry and a mounting plate 14 to attach the dimmer switch to a standard electrical wall box. One or more pushbutton switches 16 enable a user to raise and lower the dimming level of a lamp connected to the dimming switch. A push pad or paddle 18 may be used to turn the lamp completely off in two different ways as explained below. Though not shown in FIG. 1, the paddle 18 and pushbutton switches 16 include posts or tabs that extend through openings in the mounting plate 14 to actuate pushbutton switches on a circuit board inside the housing 12. The paddle 18 is mounted in a frame 20 at two pivot points, one of which is shown at 22.

When the paddle is pressed at the lower end as shown by arrow 24, the paddle rotates about the pivot points in a counterclockwise direction in the view of FIG. 1, and a tab on the back of the lower part of the paddle actuates a pushbutton switch that causes the dimmer switch to turn the lamp on or off using a solid state switch. There are situations, however, when a solid state switch allows unacceptable leakage current to flow, e.g., when replacing a burned out lamp. Therefore, the paddle is also configured to be pressed at the upper end as shown by arrow 26. When pressed at the upper end, the paddle rotates in the clockwise direction and causes a tab 28 to actuate a microswitch 30 to provide an air gap opening in the circuit, thereby eliminating leakage current. The paddle is held in the clockwise position by a latch mechanism that is not visible in the view of FIG. 1.

The frame 20 is attached to the mounting plate 14 with flexible snaps having latch portions 32 that pass through slots in the mounting plate 14. The frame 20, along with the pushbutton switches 16 and paddle 18, may be removed from the mounting plate 14 by pressing on the snaps at flexible portions 34 which releases the latch portions 32. Thus, the frame 20, pushbutton switches 16, and paddle 18 may be removed as a unit and replaced with a unit of a different color without removing the dimmer switch from the installed position.

BRIEF DESCRIPTION OF THE DRAWINGS

FIG. 11 is an exploded front view of the frame and rocker assembly shown in FIG. 10.

DETAILED DESCRIPTION

Figure 1:
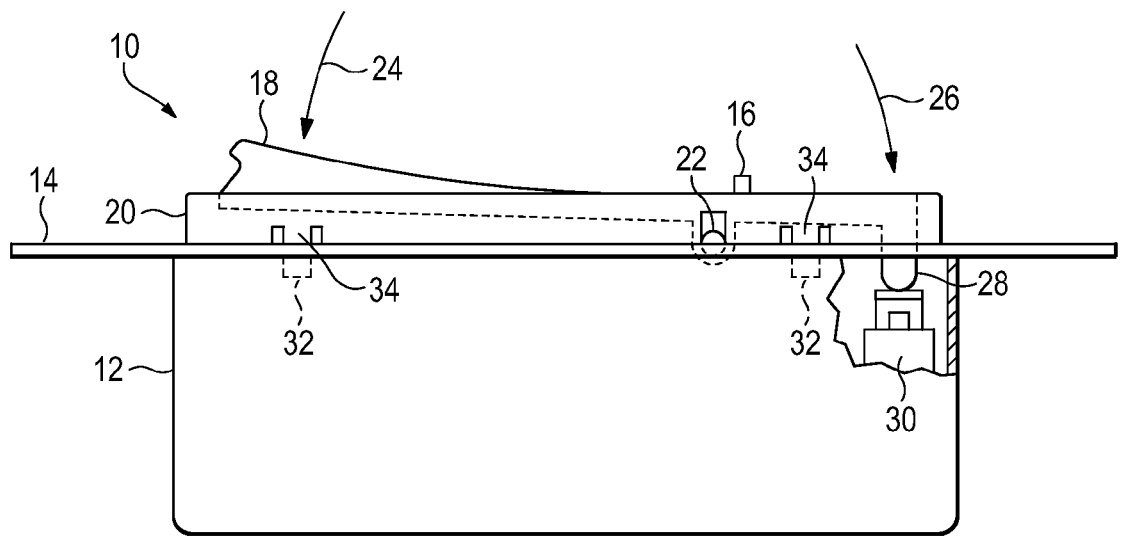
FIG. 1 is a simplified side view of a prior art dimmer switch.
Figure 2:
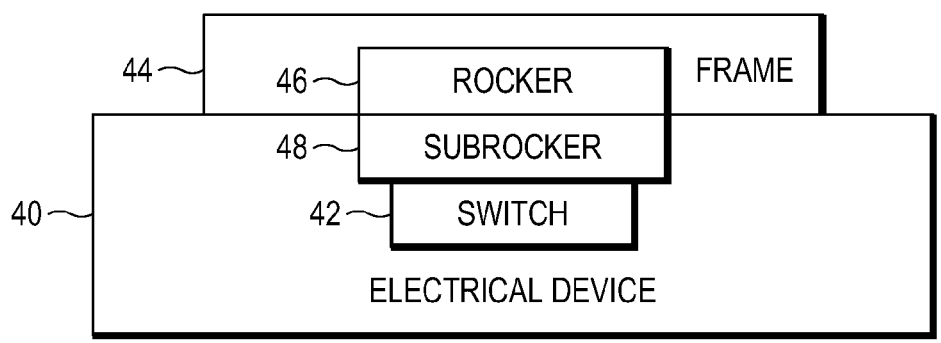
FIG. 2 is a block diagram of an embodiment of a system having a subrocker and a removable rocker according to some inventive principles of this patent disclosure.

FIG. 2 is a block diagram of an embodiment of a system having a subrocker according to some inventive principles of this patent disclosure. The embodiment of FIG. 2 includes an electrical device 40 having an electrical switch 42 for controlling a load. A frame 44 is adapted to be attached to and removed from the electrical device without removing the electrical device from the installed position. A rocker 46 is pivotally attached to the frame 44. A subrocker 48 is arranged to enable the rocker 46 to actuate the switch 42.

The electrical device 40 may be any suitable device for controlling a load such as a line switch, dimmer, fan control, etc. Although the subrocker 48 is shown within the block of the electrical device 40, it may extend outside of, or be separate from, the electrical device. The frame 44 may be attached to the frame using screws, snaps, magnets, or any other removable fastening technique to enable the frame 44 and/or rocker 46 to be removed and replaced with similar components of a different color, components with different labels, etc. The rocker 46 may be pivotally attached to the frame 44 with any suitable technique such as press-fit pins, snap-in pivots, etc.

FIGS. 3-8 illustrate an example embodiment of a system having subrockers according to some inventive principles of this patent disclosure. For purposes of illustrating some of the inventive principles, the embodiment of FIGS. 3-8 is illustrated in the context of a color change kit for a dual-rocker, wall switch that can be installed as a wiring device in a single gang position in a standard electrical box. The inventive principles, however, are not limited to the specific details described in the context of FIGS. 3-8.

Figure 3:
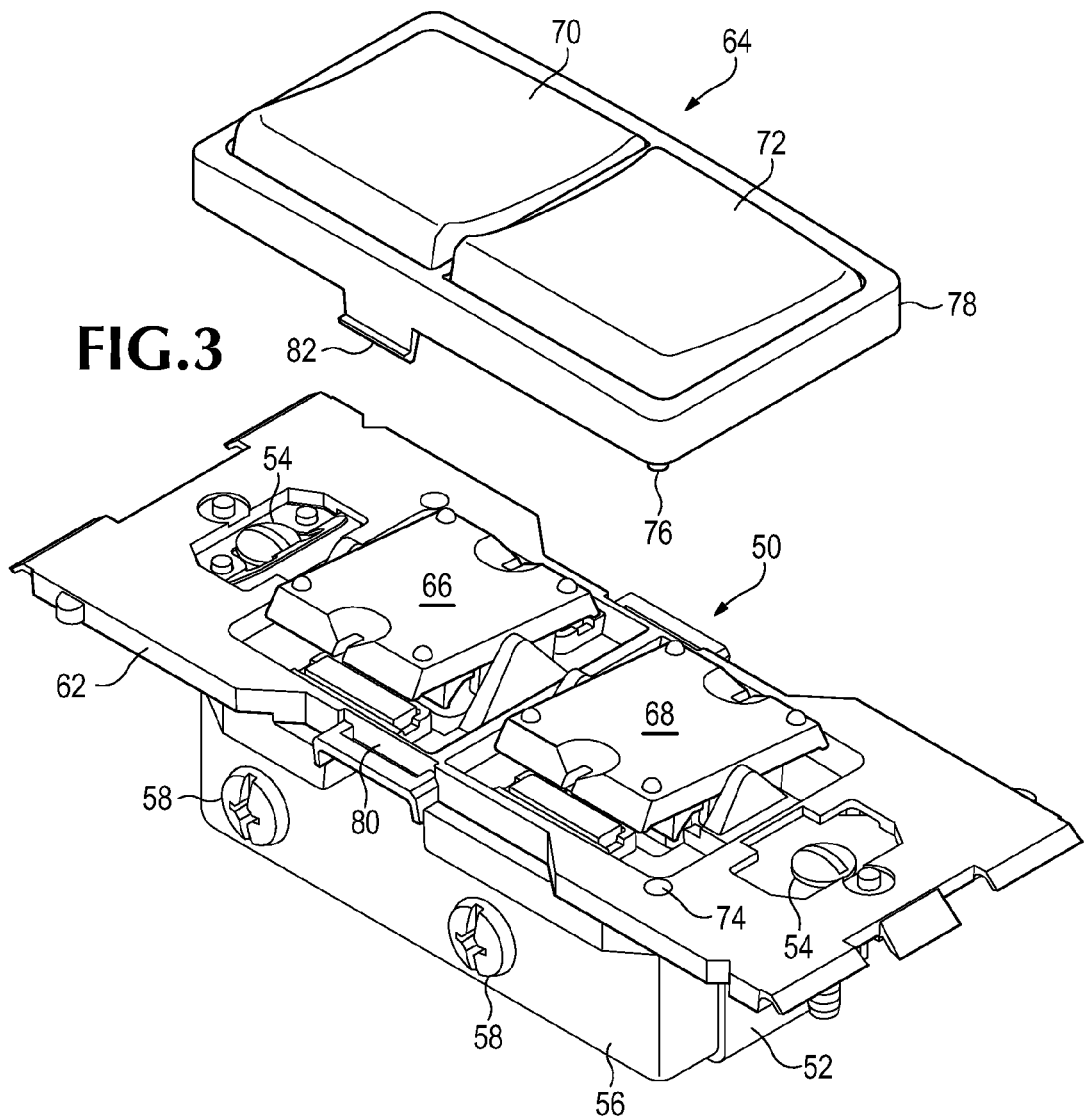
FIG. 3 is a perspective view of an example embodiment of a system according to some inventive principles of this patent disclosure.

Referring to FIG. 3, a single-gang wiring device 50 includes a metal strap 52 having holes for captive screws 54 to attach the device to a standard electrical box. A housing 56 encloses two switches within the electrical device. Screw terminals 58 provide electrical connections to a first side of each switch. Two additional screw terminals, which are not visible on this view, are located on the other side of the housing and provide electrical connections to a second side of each switch.

Figure 8:
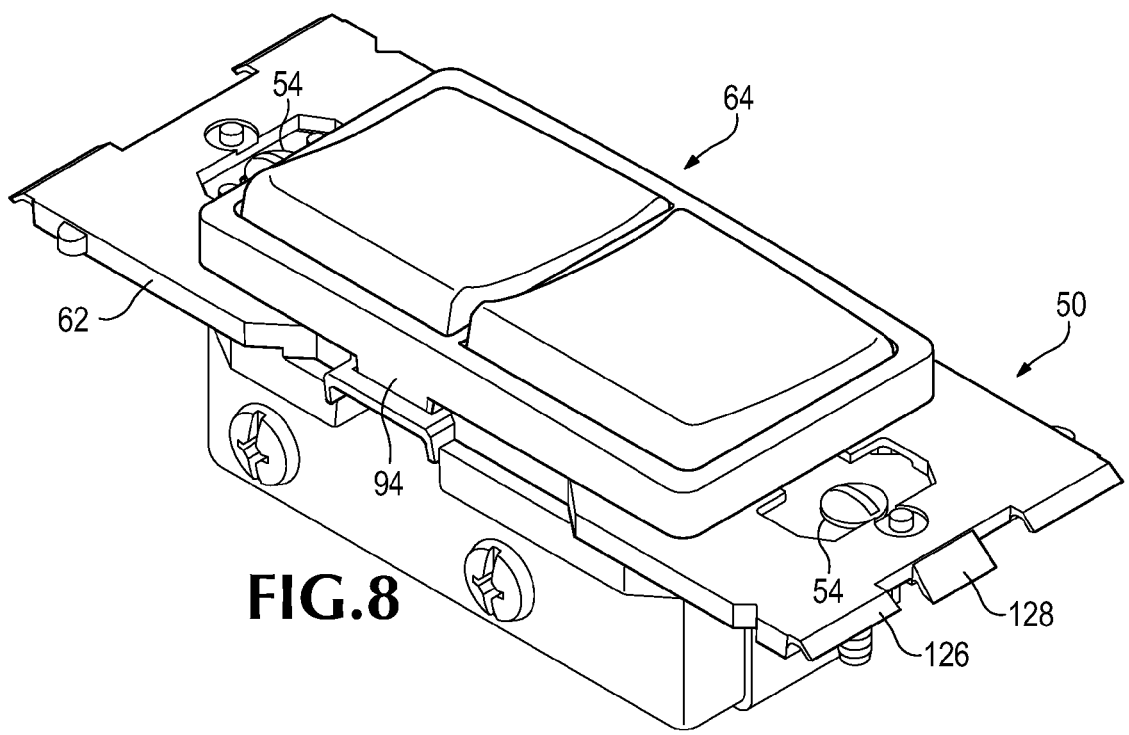
FIG. 8 illustrates the system of FIG. 3 in an assembled state.

A mounting plate 62 covers the front of the electrical device and forms part of an interface for receiving a frame and rocker assembly 64. The mounting plate 62 also facilitates installation of the electrical device in an electrical box. Two subrockers 66 and 68 are arranged to enable rockers 70 and 72 to actuate the two switches within the electrical device when the frame and rocker assembly 64 is attached to the device as shown in FIG. 8 and described below.

Referring again to FIG. 3, the interface on the mounting plate 62 includes alignment holes 74 which receive posts 76 on the frame 78 to align the frame on the device. The interface also includes slots 80 which engage compressible cantilever snaps 82 on the frame 78 to latch the frame and rocker assembly 64 in position on the electrical device 50. The frame and rocker assembly 64 may be removed from the electrical device by depressing the cantilever snaps 82 to disengage the snaps from the slots 80 as described in more detail below.

Because all of the interface apparatus is accessible from the front of the wiring device, the frame and rocker assembly may be installed, removed and/or replaced without removing the electrical device from the installed position in an electrical box. Thus, the frame and rocker assembly may be stocked, sold and/or distributed as a color change kit that enables an installer or end user to easily change the color of the visible portions of the device to coordinate with changes in the building decor or occupant preferences.

Figure 4:
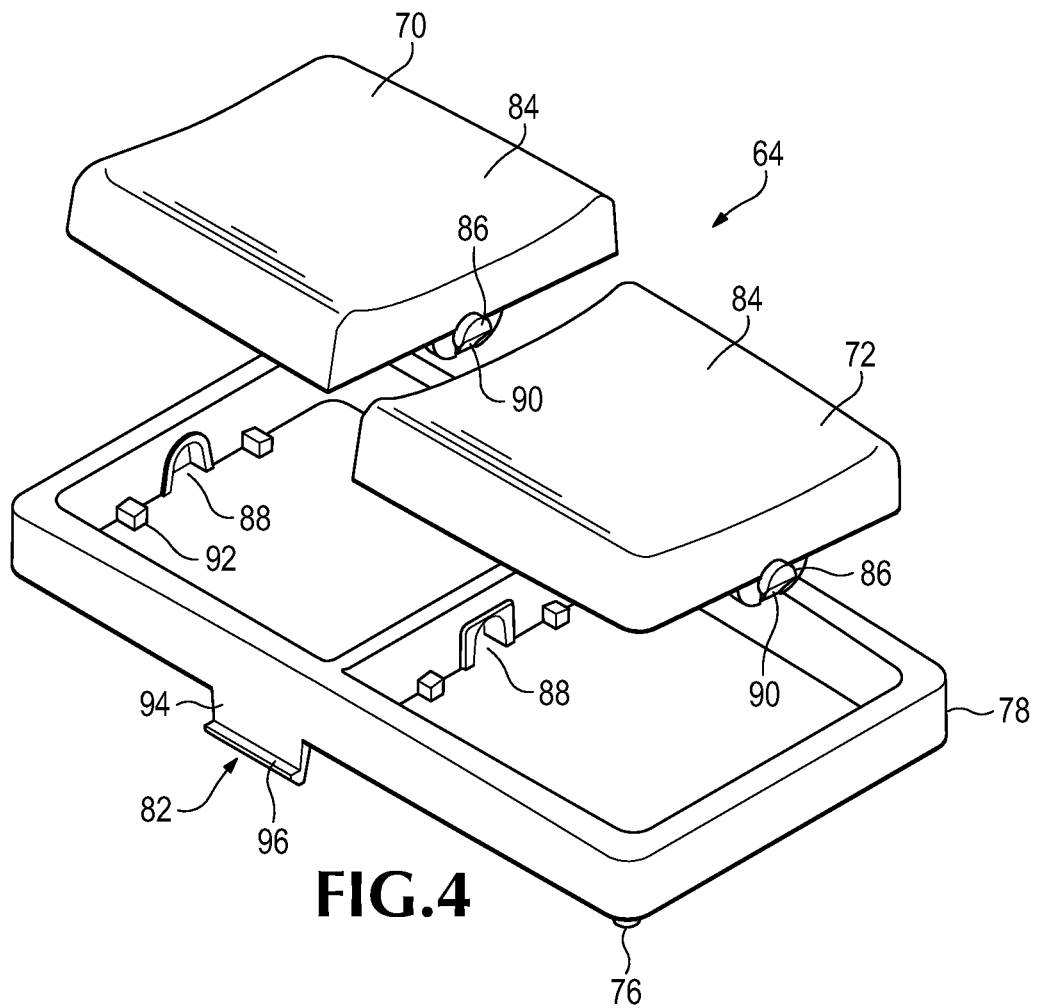
FIG. 4 is an exploded front view of the frame and rocker assembly shown in FIG. 3.

FIG. 4 is an exploded front view of the frame and rocker assembly 64 shown in FIG. 3. Referring to FIG. 4, the rockers 70 and 72 each include a tactile portion 84 which is intended to be pressed by a user to change the position of the rocker, either momentarily, as in the case of a spring loaded momentary contact switch, or indefinitely, as in the case of a toggle switch. The tactile portion is shown here as having a generally concave contour, but any other suitable shape may be used for functional and/or aesthetic reasons. Each rocker also includes two pivot pins 86 disposed on opposite sides of the rocker to engage bearing slots 88 in the frame 78, thereby enabling each rocker to pivot within the frame. In this embodiment, each pin 86 includes a wedge portion 90 that is sloped to force the sides of the rocker to flex as the rocker is assembled into position in the frame, thus enabling each rocker to be snapped into place by hand without tooling. Containment tabs 92 are located around each frame opening and project into the opening from the frame. The containment tabs 92 hold a rocker captive in the frame after the rocker is snapped into position. Each bearing slot 88 is open at the bottom for molding purposes. Without the containment tabs, a rocker may be able to pass completely through the opening in the frame. The containment tabs also limit the range through which the rockers may pivot which may be helpful for keeping the rockers oriented in the proper direction while attaching the frame and rocker assembly to the electrical device.

The frame 78 also includes two compressible cantilever snaps 82 disposed along opposite sides to engage slots 80 on the mounting plate 62. Each snap includes a flexible portion 94 that enables the snap to flex inward when depressed by a user's finger or a tool, or by action of a wedge surface on a latch portion 96 as described in more detail below. This enables the latch portion 96 to pass through the slot 80 and engage the back of the mounting plate 62 when the latch portion passes completely through the slot and the user allows the snap to spring back into the normal position.

Figure 5:
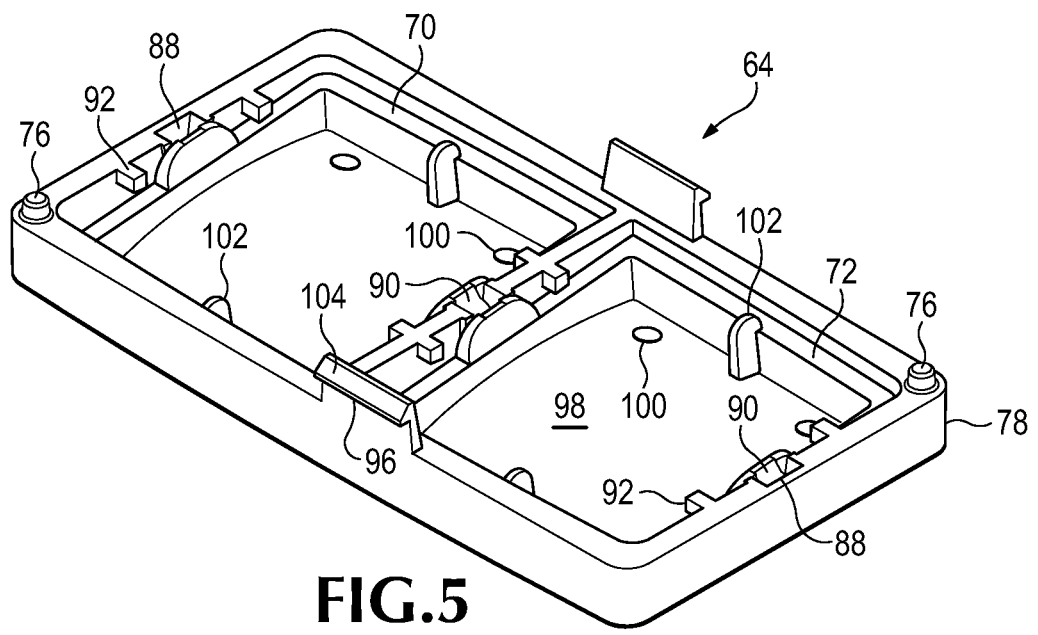
FIG. 5 is a perspective view of the back of the frame and rocker assembly of FIG. 3.

FIG. 5 is a perspective back view of the frame and rocker assembly 64 showing the rockers 70 and 72 assembled into the frame 78. In this view, the four containment tabs 92 for each rocker are visible. The containment tabs prevent the rockers from passing through the openings in the frame since the bottoms of the bearing slots 90 are open. Also in this view, the two alignment posts 76, which are located at opposite corners of the frame and engage the alignment holes 74 in the mounting plate 62, are readily visible.

Each rocker includes an inner portion 98 that is generally hollow or recessed to give the rocker an overall cap shape. The inner portion is shaped and sized to engage an outer portion of a subrocker on the electrical device as described in more detail below. Contact points 100 on the back surface of each rocker are positioned to engage protrusions on the subrockers to maintain the proper spacing between the rocker and subrocker which urges the pivot pins on the rocker against the inner surfaces of the bearing slots on the frame so that the cylindrical outer surfaces of the pivot pins engage the cylindrical inner surfaces of the bearing slots. Each rocker also includes two alignment tabs 102 that are sized and positioned to engage alignment slots on the subrockers as described in more detail below.

In the view of FIG. 5, a sloping wedge surface 104 on the latch portion of snap 96 is visible. This wedge urges the flexible portion of the snap inward when the frame 78 is pressed onto the mounting plate 62, thereby enabling the latch portion to pass through the slot and engage the back of the mounting plate when the frame is fully in position.

Figure 6:
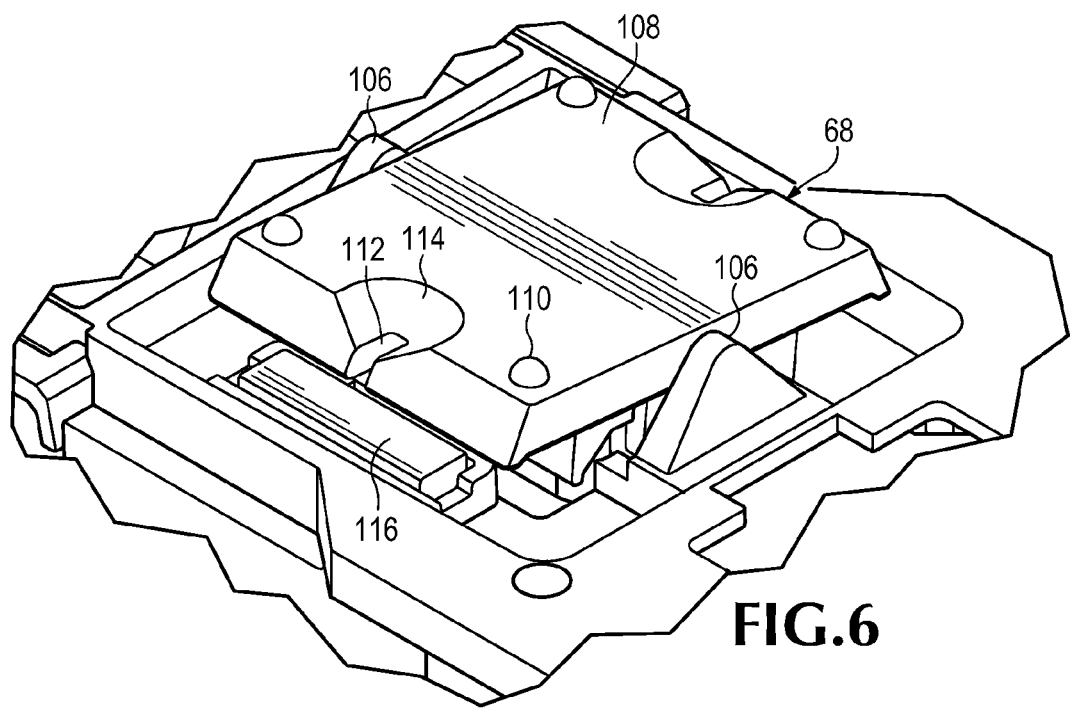
FIG. 6 is a perspective view of a portion of the wiring device of FIG. 3.

FIG. 6 is a perspective view of a portion of the wiring device 50 showing one of the subrockers in more detail. The subrocker 68 is pivotally supported by two support members 106 at pivot points on opposite ends of the subrocker. The support members project upward from the mounting plate 62 so that the subrocker pivots on an axis that is somewhat above the plane of the mounting plate. The subrocker includes an outer portion 108 that is sized and shaped to fit within the inner portion 98 of a rocker as described above so that the outer portion of the subrocker is nested within the inner portion of the rocker. Spherical protrusions 110 engage the contact points 100 on the back surface of each rocker as described above.

Each subrocker also includes two alignment slots 112 to receive the alignment tabs 102 that project from the back of the rockers. Each slot includes a cone-shaped enlarged opening 114 to guide the alignment tab into the alignment slot as the frame and rocker assembly 64 is attached to the electrical device 50. The alignment tabs and alignment slots are oriented in a plane perpendicular to the pivoting axes of the rocker and subrocker to force the axes into alignment. Resilient stops 116 are positioned under an outer lip on each side of the subrocker to limit the pivoting range of the rocker and subrocker, and to improve the tactile feeling when a user toggles the position of the rocker.

The back side of each subrocker may include any suitable structure to perform the desired switching operation. This back side structure may include, for example, one or more cams to make or break a set of contacts, one or more stops to provide an outer limit on the pivoting action of the subrockers, one or more levers or other engagement points for a spring or other resilient member to provide a return force for a momentary action switch, or to provide an over-center action, one or more detents to provide biased stopping positions for the rockers, etc.

Figure 7:
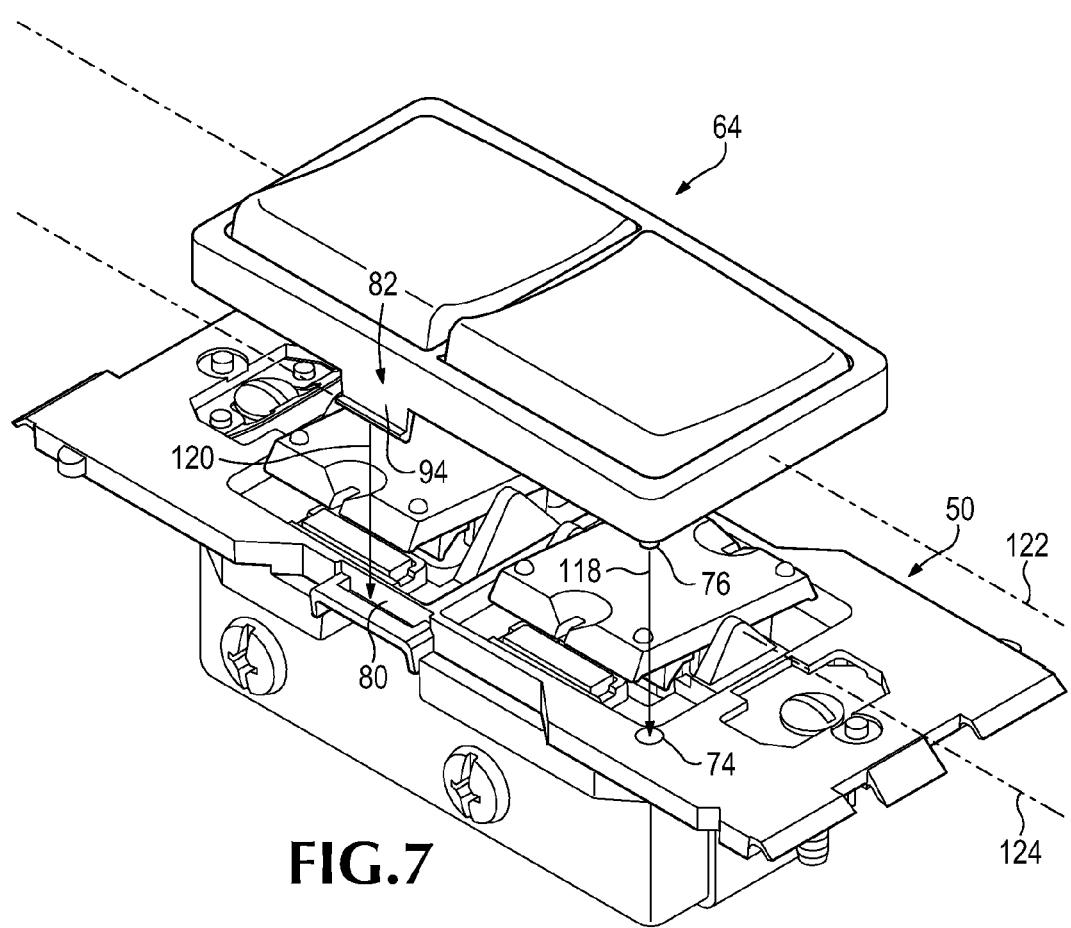
FIG. 7 illustrates how the frame and rocker assembly electrical device of FIG. 3 may be attached.

FIG. 7 illustrates how the frame and rocker assembly 64 is attached to the electrical device 50. The user visually aligns the snaps 82 with the slots 80, then presses the frame and rocker assembly into position as shown by arrows 118 and 120 until the snaps 82 latch the assembly to the device. To remove the frame and rocker assembly, the user presses on the flexible portion 94 of each snap to disengage the latch portion from the mounting plate and enable the latch portion to pass through the slot as the frame and rocker assembly is pulled away from the device.

The rockers both pivot around a first axis 122, while both of the subrockers pivot around a second axis 124. When the frame and rocker assembly is attached to the electrical device, the two axes are substantially aligned—that is, the rockers and subrockers essentially pivot around the same axis so that the mating surfaces of each rocker and its corresponding subrocker remain in reliable contact during operation.

FIG. 8 illustrates the system with the frame and rocker assembly attached to the electrical device. In this view, the flexible portion 94 of the snap is visible showing that the snap may be flexed to remove the frame and rocker assembly without removing mounting screws 54 or in any other way having to disturb the electrical device from the installed position.

The embodiment shown in FIG. 8 also includes flexible mounting tabs 126 and a flexible release tab 128 at either end to accommodate a screw less cover plate to conceal the portions of the device not covered by the frame and rocker assembly. Thus, the electrical device includes an integral mounting plate 62 that can accommodate a screw less cover plate.

Some additional inventive principles of this patent disclosure relate to interchangeable actuator frames that may be pivotally attached to, and removed from, an electrical device.

Figure 9:
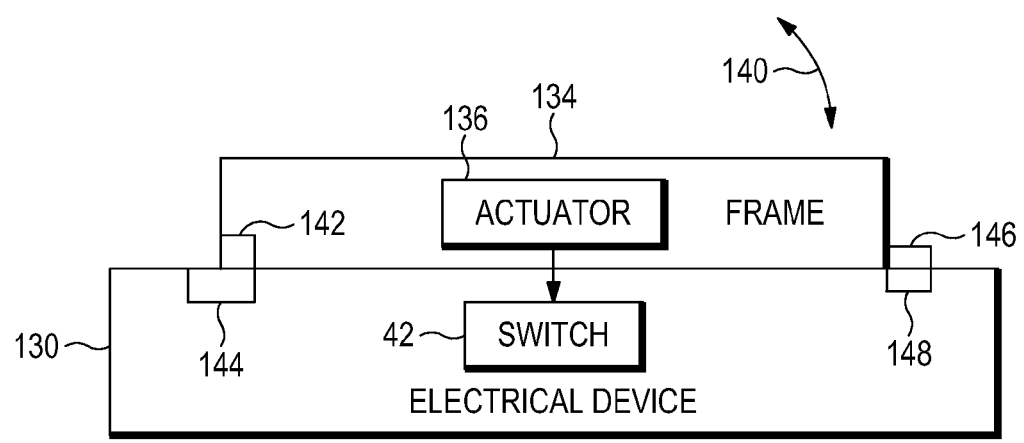
FIG. 9 is a block diagram of an embodiment of a replaceable actuator frame system according to some inventive principles of this patent disclosure.

FIG. 9 is a block diagram of an embodiment of a replaceable actuator frame system according to some inventive principles of this patent disclosure. The embodiment of FIG. 9 includes an electrical device 130 having an electrical switch 132 for controlling a load. A removable frame 134 includes an actuator 136 for actuating the switch 132 when the frame is in an installed position as shown in FIG. 9. The frame may be pivotally engaged to the electrical device to enable the frame to pivot towards or away from the electrical device as shown by arrow 140. The pivoting functionality may be implemented with a first retention feature 142 on the frame that is adapted to engage or disengage a second retention feature 144 on the electrical device. The frame may also include a first fastening feature 146 that may engage a second fastening feature 148 on the electrical device to maintain the frame in the installed position.

The frame may pivot at any suitable location which, depending on the implementation details, may typically be at or near an end of the frame 134. The fastening features 146 and 148 may also be positioned at any suitable location anywhere along the frame, and depending on the implementation, may typically be far enough away from the pivot point to securely fasten the frame to the electrical device. The fastening features may be implemented with screws, snaps, magnets, or any other removable fastening technique.

The actuator 136 may be any suitable type such as a pushbutton, rocker, toggle, etc. The electrical device 130 may be any suitable device for controlling a load such as a line switch, dimmer, fan control, etc. The retention features may be implemented with any suitable pivoting attachment technique such as hinge pins, hinge feet, rotating tabs, etc.

FIGS. 10-17 illustrate an example embodiment of an interchangeable frame system according to some inventive principles of this patent disclosure. For purposes of illustrating some of the inventive principles, the embodiment of FIGS. 10-17 is described in the context of a color change kit for a single-pole wall switch that can be installed as a wiring device in a single gang position in a standard electrical box. The inventive principles, however, are not limited to these specific details and may be applied to any type of interchangeable frame for an electrical device.

Figure 10:
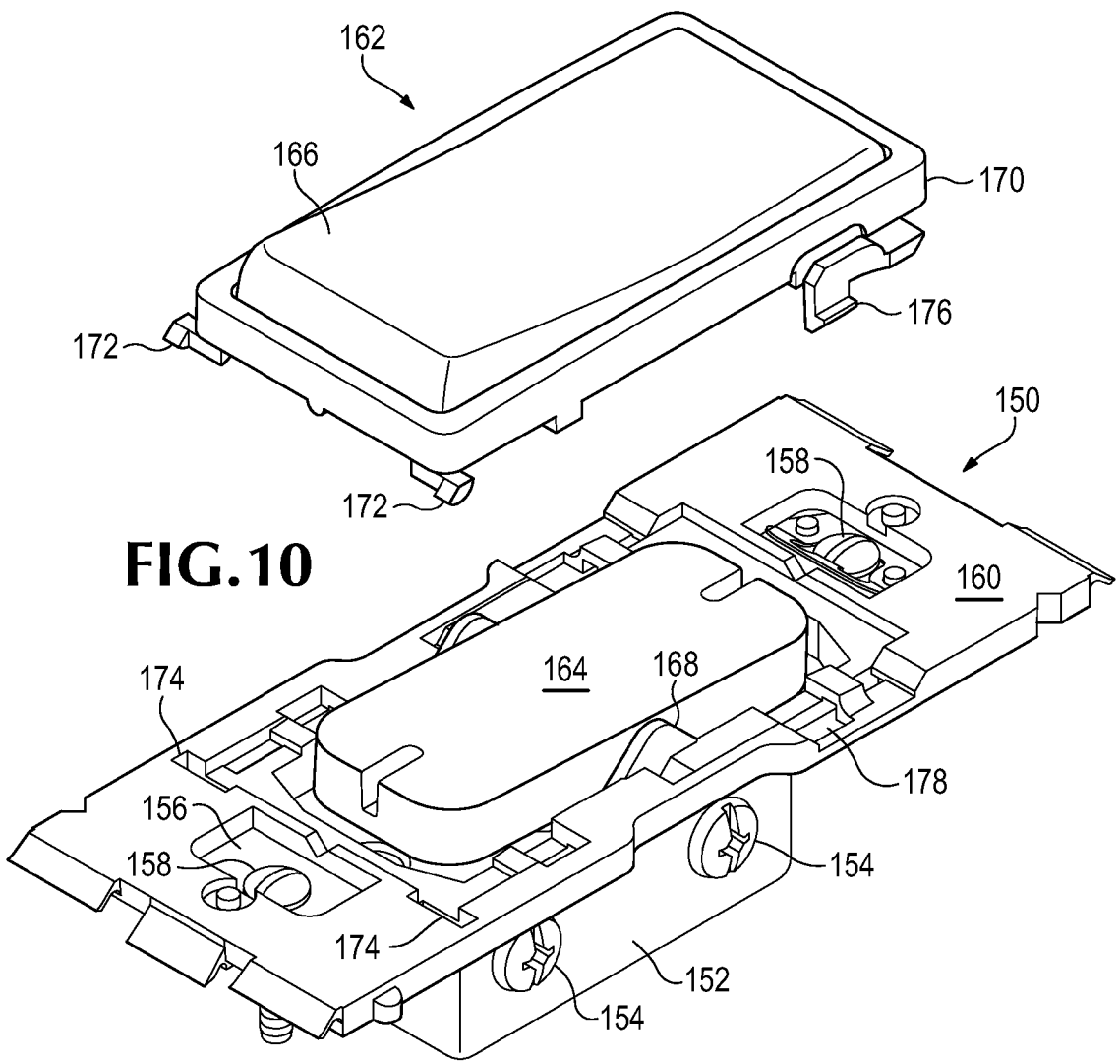
FIG. 10 illustrates an example embodiment of a replaceable actuator frame system according to some inventive principles of this patent disclosure.

Referring to FIG. 10, an electrical device 150 includes a housing 152 that encloses, a switch which is electrically accessible through screw terminals 154. A metal mounting frame 156 provides a ground connection to a standard electrical box through screws 158. The mounting frame may be based, for example, on the mounting frame for an existing switch such as a Decora® brand designer switch to make use of existing parts. The electrical device also includes a plastic subframe 160 that covers the front of the electrical device and includes an interface for receiving a frame and actuator assembly 162. In this embodiment, the actuator is implemented as a rocker 166. A subrocker 164 is arranged to enable the rocker 166 to actuate the switch within the device when the frame and actuator assembly is installed on the electrical device 150 as described below.

The rocker and subrocker aspects of the embodiment of FIG. 10 is similar to the embodiment of FIGS. 3-8 in that the subrocker is pivotally mounted to the electrical device 150 at pivot points 168 to enable the rocker 166 on frame 170 to actuate a switch in the electrical device. The rocker, subrocker, and frame may include alignment features, snap-together construction, containment tabs, etc. as described below that work in essentially the same way as the embodiment of FIGS. 3-8.

In the embodiment of FIG. 10, however, the actuator frame 170 and electrical device 150 include retention features that enable the frame to be pivotally engaged to the device, then pivoted into an installed position to engage the rocker with the subrocker as described in more detail below. Fastening features on the frame and device may then be engaged to secure the frame in the installed position. These retention and fastening features may be implemented in a manner that enables the frame to be installed and removed without removing the electrical device from an installed position.

In the embodiment of FIG. 10, the retention features are implemented with hinge feet 172 that can be inserted into openings 174 in the subframe 160, and the fastening features are implemented with snaps 176 that latch into slots 178 as described in more detail below.

Although this embodiment is described in the context of a rocker switch, the inventive principles may also be applied to removable actuator frames that use pushbuttons, slides or any other type of actuator for the electrical device.

FIG. 11 is an exploded front view of the frame and rocker assembly 162 shown in FIG. 10. Referring to FIG. 11, the rocker 166 includes a tactile portion 180 which is intended to be pressed by a user to change the position of the rocker, either momentarily, as in the case of a spring loaded momentary contact switch, or indefinitely, as in the case of a toggle switch. The tactile portion is shown here as having a generally concave contour, but any other suitable shape may be used for functional and/or aesthetic reasons. The rocker 166 also includes two pivot pins 182 disposed on opposite sides of the rocker to engage bearing slots 184 in the frame 170, thereby enabling the rocker to pivot within the frame. In this embodiment, each pivot pin 182 includes a wedge portion that is sloped to force the sides of the rocker to flex as the rocker is assembled into position in the frame, thus enabling each rocker to be snapped into place by hand without tooling. Containment tabs 186 are located around the frame opening and project into the opening from the frame. The containment tabs 186 hold the rocker captive in the frame after the rocker is snapped into position. Each bearing slot 184 is open at the bottom for molding purposes. Without the containment tabs, the rocker may be able to pass completely through the opening in the frame. The containment tabs also limit the range through which the rocker may pivot which may be helpful for keeping the rocker oriented in the proper direction while attaching the frame and rocker assembly to the electrical device.

Figure 12:
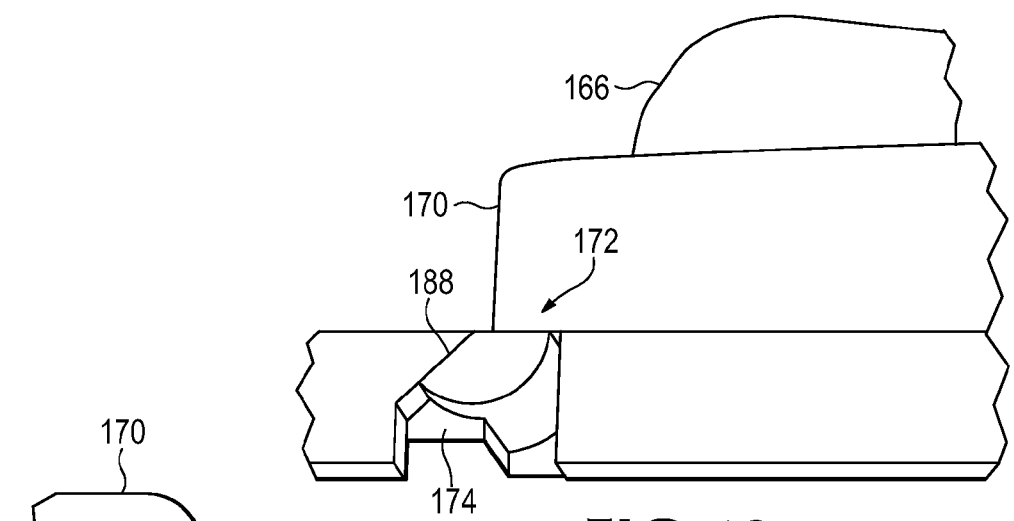
FIG. 12 is a partial cutaway perspective view of the retention feature shown in FIG. 10.

The hinge feet 172 are located at one end of the frame and include stop surfaces 188 that engage corresponding surfaces in the openings 174 of the subframe 160 when the frame is pivoted into the installed position as shown in the partial cutaway perspective view of FIG. 12.

The frame 170 also includes two snaps 176 disposed along opposite sides of the frame near the end of the frame that is generally opposite the hinge feet. Each snap includes a latch portion 190 that engages the subframe 160 through slots 178. The latch portion 190 is attached to the frame by an arm 192 which flexes to enable the latch portion to pivot into a recess 194 in the side of the frame 170 when the snap is pressed to install or release the frame from the subframe.

Figure 13:
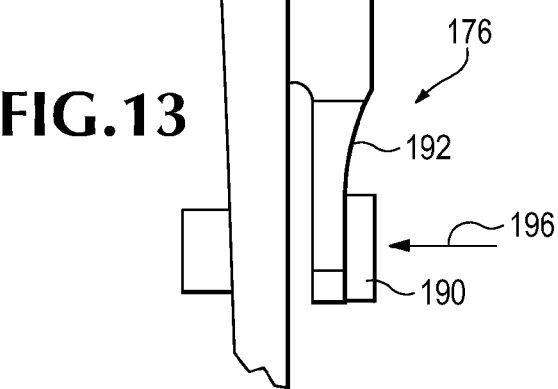
FIG. 13 is a top plan view of a portion of the frame from FIG. 10 including a snap.

FIG. 13 is a top plan view of a portion of the frame 170 showing how the latch portion 190 of snap 176 is attached to the frame by an arm 192 that enables the latch portion to flex inward as shown by arrow 196.

The snap arrangement illustrated in FIGS. 11 and 13 may provide adequate flexing to actuate the latch while still maintaining a low profile above the subframe. Having the two snaps located on opposite sides of the frame enables a user to conveniently actuate both snaps at the same time by squeezing the snaps toward each other.

Figure 14:
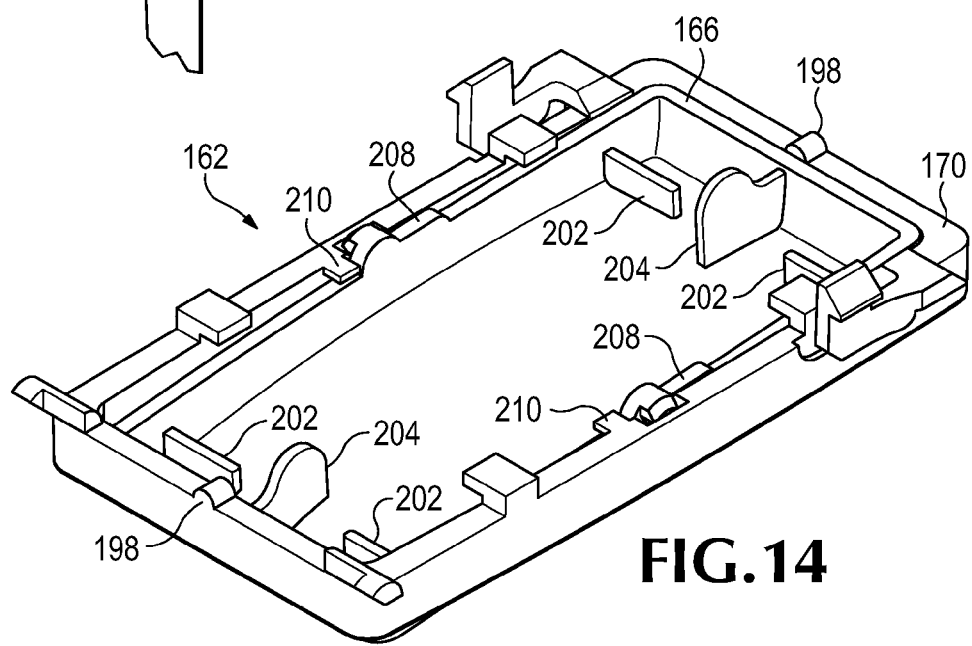
FIG. 14 is a perspective view of the back of the frame and actuator assembly of FIG. 10.
Figure 15:
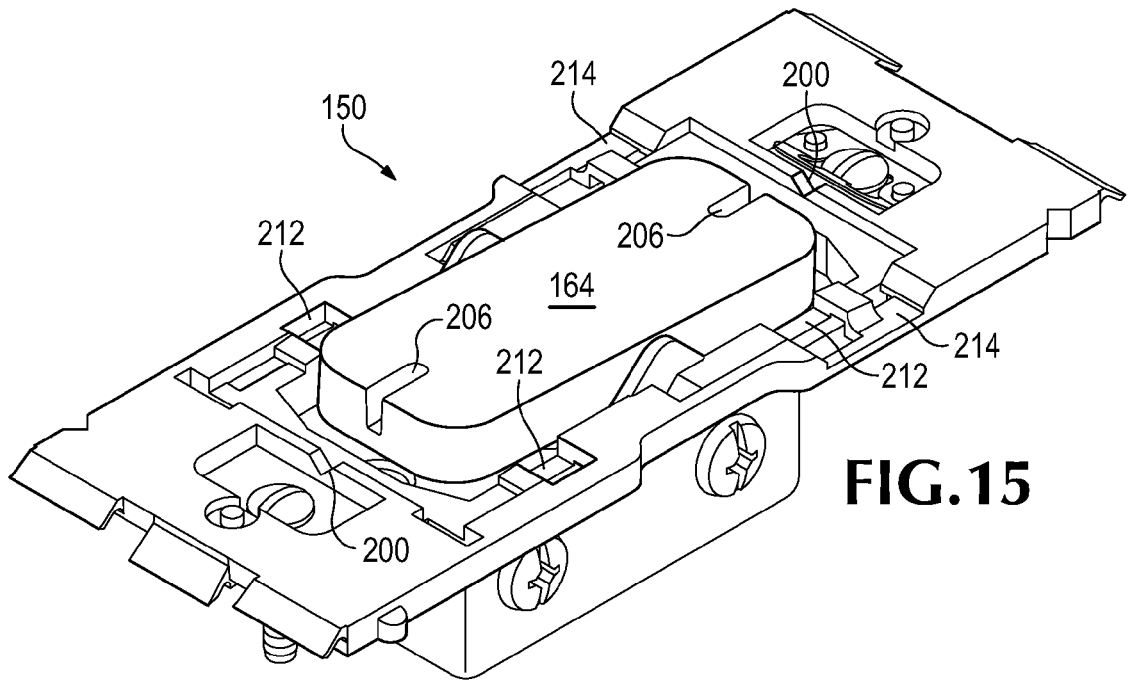
FIG. 15 is another perspective view of the wiring device of FIG. 10.

FIG. 14 is a perspective back view of the frame and actuator assembly 162 showing the rocker 166 assembled into the frame 170. The frame 170 also includes two cylindrical alignment tabs 198 that engage two V-shaped alignment slots 200 on the subframe as shown in FIG. 15 to provide horizontal alignment as the frame is attached to the subframe. As is apparent from FIG. 14, the back side of the rocker is recessed to enable the subrocker 164 to nest inside the rocker. Spacer tabs 202 maintain the proper spacing between the rocker and subrocker to force the pivot pins on the rocker to engage the cylindrical part of the bearing slots in the frame. Alignment tabs 204 on the back of the rocker engage with alignment slots 206 on the subrocker 164 as shown in FIG. 15.

Also visible in FIG. 14 are orientation tabs 208 on the rocker and orientation tabs 210 on the frame that prevent the rocker from being installed in the frame in an incorrect orientation.

FIG. 15 is another perspective view of the wiring device 150 showing the two V-shaped alignment slots 200 on the subframe that engage the cylindrical alignment tabs 198 on the frame 170. Also visible are the alignment slots 206 on the subrocker 164 that engage with the alignment tabs 204 on the back of the rocker. The subframe also includes recesses 212 to accommodate the containment tabs 186 on the frame, and recesses 214 to accommodate the arms 192 of the snaps 176.

Figure 16:
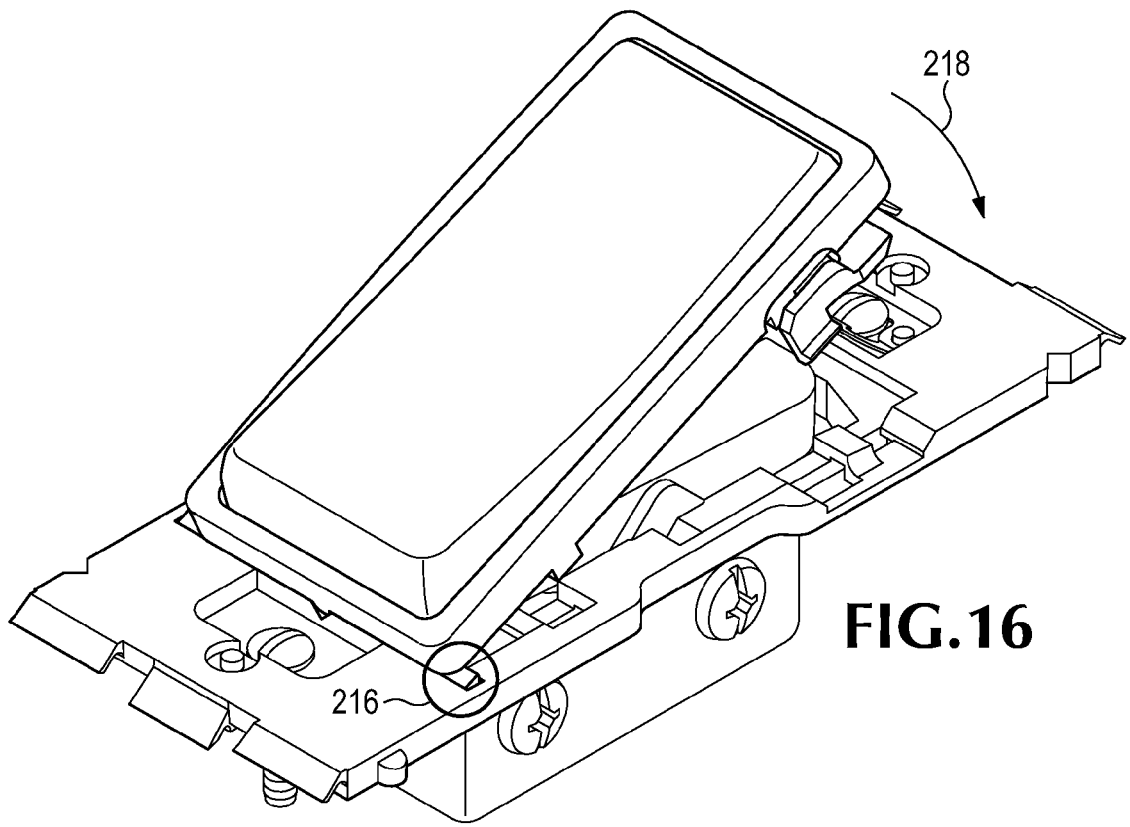
FIG. 16 illustrates how the frame and rocker assembly and electrical device of FIG. 10 may be attached.
Figure 17:
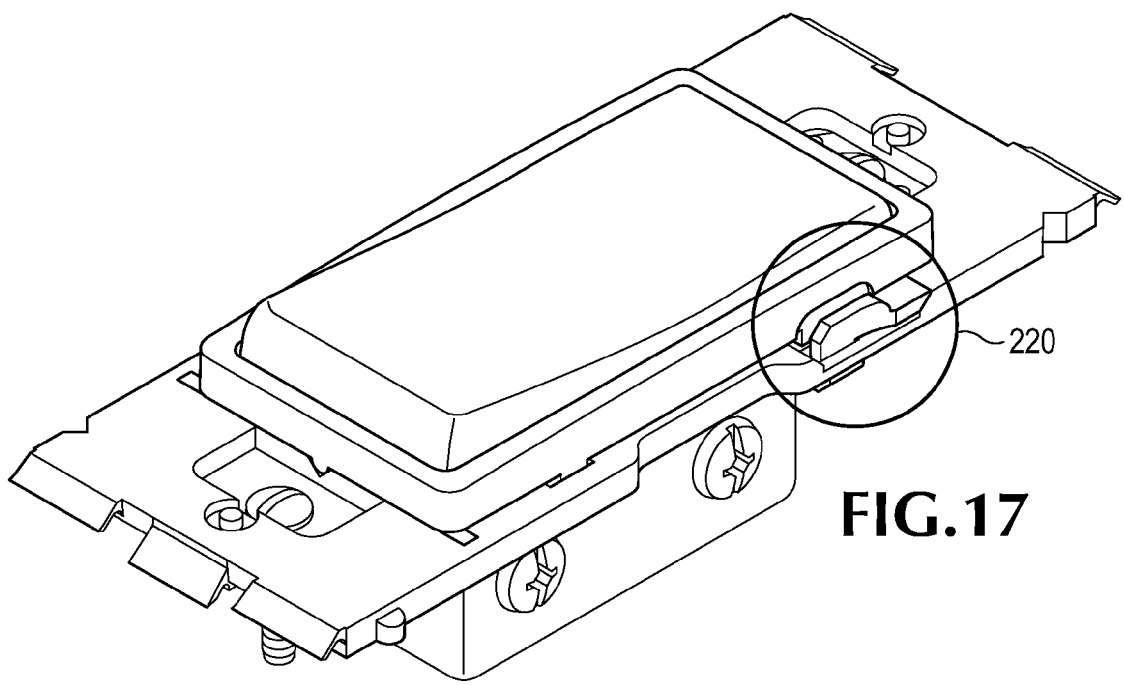
FIG. 17 illustrates frame and rocker assembly and electrical device of FIG. 10 in an assembled state.

FIG. 16 illustrates how the frame and rocker assembly 170 may be attached to the electrical device 150. The user inserts the hinge feet 172 into the openings 174 in the subframe as shown at 216 while maintaining the frame in a position that is angled away from the subframe. The user then pivots the frame in the direction of arrow 218 until the snaps engage the slots on the subframe as shown at 220 in FIG. 17 to hold the frame in the installed position. As the frame is pivoted, the alignment tabs 198 engage alignment grooves 200 to align the frame with the subframe, and the alignment tabs 204 engage the alignment slots 206 to align the rocker with the subrocker, thereby providing a reliable and convenient installation for the installer or end user.

In this embodiment, the rocker pivots around a first axis that passes through the frame, and the frame pivots around a second axis that passes through the hinge feet and is parallel with the first axis. This enables the alignment tabs on the back of the rocker to engage smoothly with the alignment slots on the subrocker.

As described above, the inventive principles of this patent disclosure enable a frame and actuator assembly to be installed, removed and/or replaced as a color change kit for an electrical switch. However, the inventive principles also enable other novel methods and apparatus. For example, rather than, or in addition to, providing a color change kit, the inventive principles may also provide a flexible system for repairing or replacing individual actuators for an electrical device. Individual rockers may be preprinted with labels such as room names, scene types or numbers, power levels, etc., for use with switching, dimming, or preset systems. Blank actuators may also be provided to enable a user or installer to create custom labels. A frame and actuator assembly according to the inventive principles of this patent disclosure may enable rockers to be selected based on the particular installation, then snapped into the frame and attached to the electrical device. The labels may easily be changed later without removing the electrical device from the installed position.

Although referred to as a color change kit, a kit according to the inventive principles may also serve as a color installation kit. That is, an electrical distributor or installer may stock an electrical device having an interface for accepting a frame and actuator assembly. The electrical device may be installed as a generic device, and the installation of the frame and actuator assembly may be left for a decorator, user, design consultant, etc., who may select from a range of available or custom colors at a later date.

The inventive principles are not limited to any particular number or orientation of rockers or other actuators. One, two, three, four or more rockers may be included and aligned along one or more vertical or horizontal axes, etc. Likewise any number of pushbuttons, slides, etc., may be held by an actuator frame in any orientation.

The inventive principles are likewise not limited to single-strap wiring devices for standard electrical boxes. The inventive principles may be applied to multi-gang devices, in-line wiring devices, etc.

The rockers, subrockers, frames and many of the other components described above may typically be fabricated from various types of engineering plastics to provide durability, insulating qualities, flexibility for snap-together assembly, etc., but any other suitable materials may be used.

Various features such as alignment features and fastening features have been described with examples such as alignment tabs and slots, latching snaps and slots, etc. Any of these features, however, may be realized in other ways. For example, a frame and actuator assembly may be attached to an electrical device with screws clips or other fastening techniques while still enabling the assembly to be removed or replaced without removing the device from the installed position.

Some additional inventive principles of this patent disclosure relate to electrical devices having subactuators with rims that overlap rims on the electrical device. Overlapping rims may be beneficial, for example, to prevent contamination to, or contact with, live electrical parts when color change actuator and frame assembly are removed from the electrical device.

Figure 18:
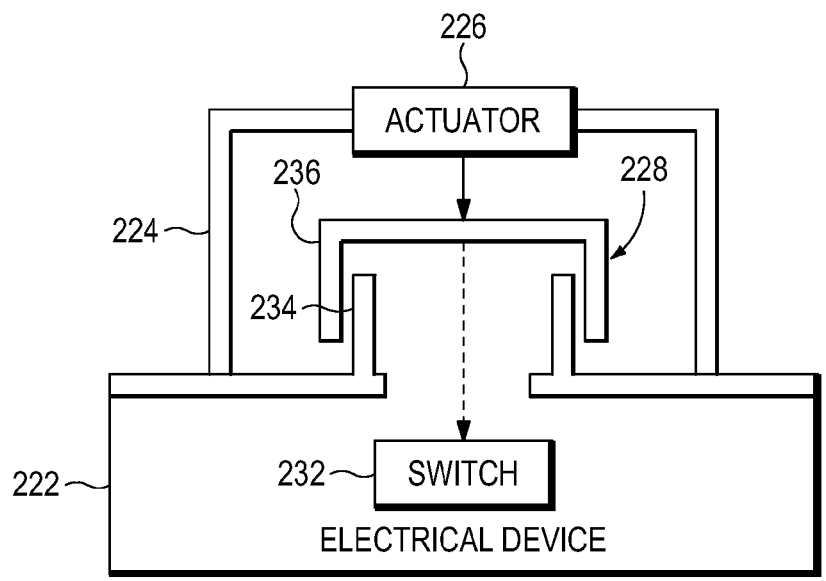
FIG. 18 illustrates an embodiment of a system including an electrical device and subactuator with overlapping rims according to some inventive principles of this patent disclosure.

FIG. 18 illustrates an embodiment of a system including an electrical device and subactuator with overlapping rims according to some inventive principles of this patent disclosure. The electrical device 222 includes a removable frame 224 having an actuator 226 arranged to engage a subactuator 228. The electrical device has an opening 230 through which the subactuator 228 can actuate a switch 232. The electrical device includes one or more rims 234 that overlap with one or more rims 236 of the subactuator to prevent foreign objects from accessing the opening 230 when the frame 224 is removed from the electrical device.

The actuator 226 and subactuator may be any type such as pushbuttons, rockers, toggles, slides, etc. The electrical device 222 may be any suitable device for controlling a load such as a line switch, dimmer, fan control, etc. The one or more rims 234 on the electrical device and the one or more rims 236 on the subactuator may extend completely around the opening 230 or only a portion of the opening.

Figure 19:
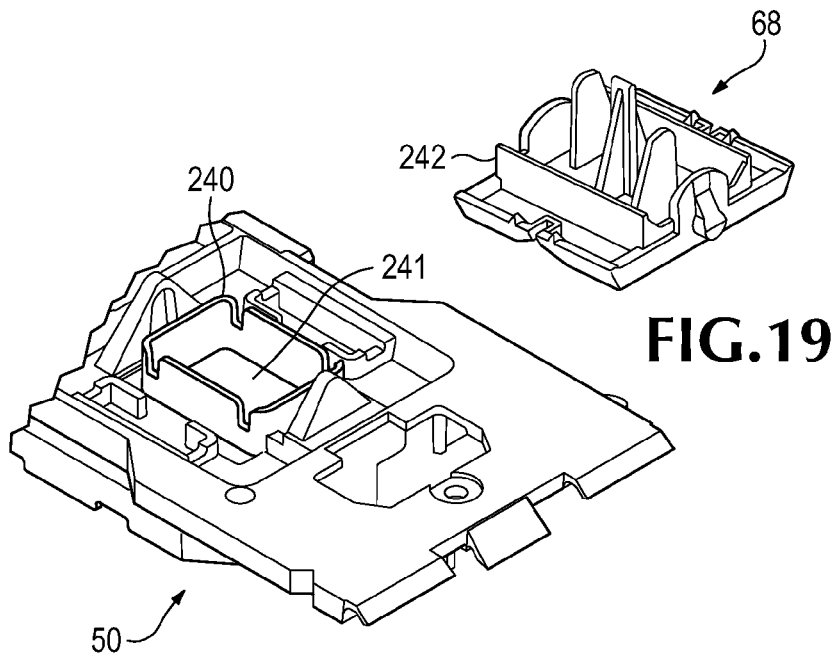
FIG. 19 illustrates an example embodiment of a system including an electrical device and subactuator with overlapping rims according to some inventive principles of this patent disclosure.

FIG. 19 illustrates an example embodiment of a system including an electrical device and subactuator with overlapping rims according to some inventive principles of this patent disclosure. The embodiment of FIG. 19 is based on the embodiment of FIGS. 3-8 and includes an electrical device 50 having a rim 240 surrounding an opening 241 through which subrocker 68 actuates an electrical switch when installed on the device. The subrocker 68 is shown in an inverted position so the rim 242 is visible. The rim 242 may also include portions of the sidewalls of the subrocker. When the subrocker is installed on the device as shown in FIG. 6, the rim 242 overlaps the rim 240 to prevent foreign objects from contacting live electrical components through the opening 241.

Figure 20:
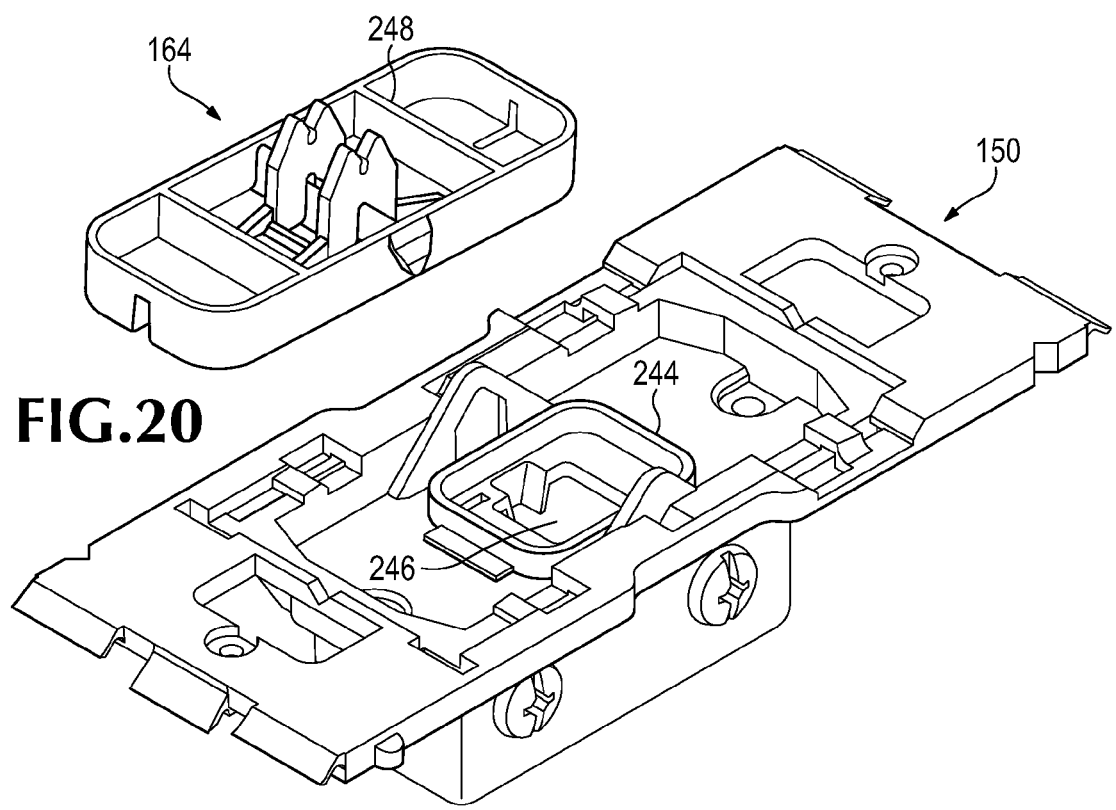
FIG. 20 illustrates another example embodiment of a system including an electrical device and subactuator with overlapping rims according to some inventive principles of this patent disclosure.

FIG. 20 illustrates another example embodiment of a system including an electrical device and subactuator with overlapping rims according to some inventive principles of this patent disclosure. The embodiment of FIG. 20 is based on the embodiment of FIGS. 10-17 and includes an electrical device 150 having a rim 244 surrounding an opening 246 through which subrocker 164 actuates an electrical switch when installed on the device. The subrocker 164 is shown in an inverted position so the rim 248 is visible. The rim 248 may also include portions of the sidewalls of the subrocker. When the subrocker is installed on the device as shown in FIG. 15, the rim 248 overlaps the rim 244 to prevent foreign objects from contacting live electrical components through the opening 246.

The inventive principles relating to overlapping rims may enable a system to achieve enhanced levels of reliability and/or safety. For example, the use of overlapping rims on subactuators may enable a system to conform to the articulated finger test which is a common requirement for some safety agency certifications.

The inventive principles of this patent disclosure have been described with reference to some specific example embodiments, but these embodiments can be modified in arrangement and detail without departing from the inventive concepts. Thus, any changes and modifications are considered to fall within the scope of the following claims.

The invention claimed is:

1. A system comprising:
an electrical device having an interface adapted to enable a frame to be attached to and removed from the electrical device;
an opening in the electrical device;
a subactuator arranged to actuate a switch in the electrical device through the opening, and to engage an actuator on the frame when the frame is attached to the electrical device; and
a first rim disposed about the opening;
where the subactuator includes a second rim arranged to overlap the first rim.

2. The system of claim 1 wherein:
the actuator comprises a rocker and the subactuator comprises a subrocker; and
wherein the frame is an interchangeable frame configured to be attached to the electrical device by a user without using a hand held tool and without disturbing the electrical device from an installed position, the;
wherein the frame has a retention feature disposed adjacent a short side of the frame to pivotally engage the electrical device about the short side.

3. The system of claim 1 wherein:
the subactuator comprises a subrocker;
the frame comprises an interchangeable frame configured to be removably attached to an electrical device by a user without a hand held tool and without disturbing the electrical device from an installed position, the actuator comprising a rocker, wherein the rocker is configured to engage the subrocker on an electrical device;
where the frame has a retention feature disposed adjacent a short side of the frame to pivotally engage the electrical device about the short side.

4. The system of claim 1 further comprising a subframe attached to the electrical device, where the interface is arranged on the subframe.

5. The system of claim 1 where the frame includes a first retention feature to pivotally engage a second retention feature on the electrical device.

6. The system of claim 5 where:
the first retention feature comprises a hinge foot.

7. The system of claim 5, wherein the second retention feature comprises a second opening on the electrical device.

8. The system of claim 5 where the frame further includes a first fastening feature adapted to engage a second fastening feature on the electrical device to maintain the frame in an installed position.

9. The system of claim 8 where:
the first fastening feature comprises a snap.

10. The system of claim 9, wherein the second fastening feature comprises a third opening on the electrical device.

11. The system of claim 1 where the frame further includes a first alignment feature adapted to engage a second alignment feature on the electrical device to align the frame with the electrical device during installation of the frame.

12. The system of claim 11 where:
the first alignment feature comprises a cylindrical tab; and
the second alignment feature comprises a V-shaped groove.

13. The system of claim 2 where:
the rocker includes a first alignment feature; and
the subrocker includes a second alignment feature to engage the first alignment feature to align the rocker and subrocker during installation of the frame to the electrical device.

14. The system of claim 13 where:
the first alignment feature comprises a tab; and
the second alignment feature comprises a slot.

15. The system of claim 8 where the snap includes:
a latch portion; and
an arm portion arranged between the latch portion and the frame.

16. The system of claim 15 where the arm portion is arranged to flex to enable the latch to disengage from the electrical device.

17. The system of claim 1 where the actuator comprises a rocker pivotally attached to the frame.

18. The system of claim 17 where the frame comprises one or more containment tabs arranged to hold the rocker captive in the frame.

19. The system of claim 17 where:
the rocker is arranged to pivot around a first axis;
the frame is configured to pivot around a second axis; and
the first and second axes are substantially parallel.

20. The system of claim 8 where the frame further includes a third fastening feature adapted to engage a fourth fastening feature on the electrical device.

21. The system of claim 20 where the first and third fastening features are positioned on opposite sides of the frame and arranged to be actuated by squeezing the first and third fastening features toward each other.

22. The system of claim 1 where the first and second rims are arranged to prevent accidental contact with live components in the electrical device when the frame is not attached to the electrical device.

23. The system of claim 22 where the subactuator comprises a subrocker.

* * * * *